US008400015B2

(12) United States Patent
Malik et al.

(10) Patent No.: US 8,400,015 B2
(45) Date of Patent: Mar. 19, 2013

(54) HIGHLY AVAILABLE NODE REDUNDANCY POWER ARCHITECTURE

(75) Inventors: Randhir S. Malik, Cary, NC (US); Jan M. Janick, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 520 days.

(21) Appl. No.: 12/723,654

(22) Filed: Mar. 14, 2010

(65) Prior Publication Data

US 2011/0222258 A1  Sep. 15, 2011

(51) Int. Cl.
*H02J 7/00* (2006.01)
(52) U.S. Cl. ......................................... 307/66
(58) Field of Classification Search .................. 307/66
See application file for complete search history.

(56) References Cited

U.S. PATENT DOCUMENTS

| | | | |
|---|---|---|---|
| 6,311,279 | B1 | 10/2001 | Nguyen |
| 7,262,694 | B2 | 8/2007 | Olsen et al. |
| 2008/0290977 | A1* | 11/2008 | Ito et al. .................. 336/184 |
| 2010/0013313 | A1* | 1/2010 | Groff et al. ............... 307/66 |

OTHER PUBLICATIONS

Shneidman, Jeffrey, et al., Specification Faithfulness in Networks with Rational Nodes, pp. 88-97, Division of Engineering and Applied Sciences, Harvard University, Cambridge, MA.

* cited by examiner

*Primary Examiner* — Robert L. Deberadinis
(74) *Attorney, Agent, or Firm* — Jeffrey P. Aiello

(57) ABSTRACT

According to one embodiment, an apparatus for providing node redundant power to a system includes a plurality of devices, with each device including a power supply. Each power supply includes a first direct current (DC) input coupled to a first input of an OR logic gate, and a second DC input representing by an alternating current (AC) input. The second DC input is coupled to a second input of the OR logic gate, and at least one DC output is coupled to an output of the OR logic gate. Each power supply also includes a backup power supply for supplying a voltage coupled to a common node. The OR logic gate provides DC voltage to the DC output to power the system from the first DC input only when voltage from the AC input is not available.

13 Claims, 5 Drawing Sheets

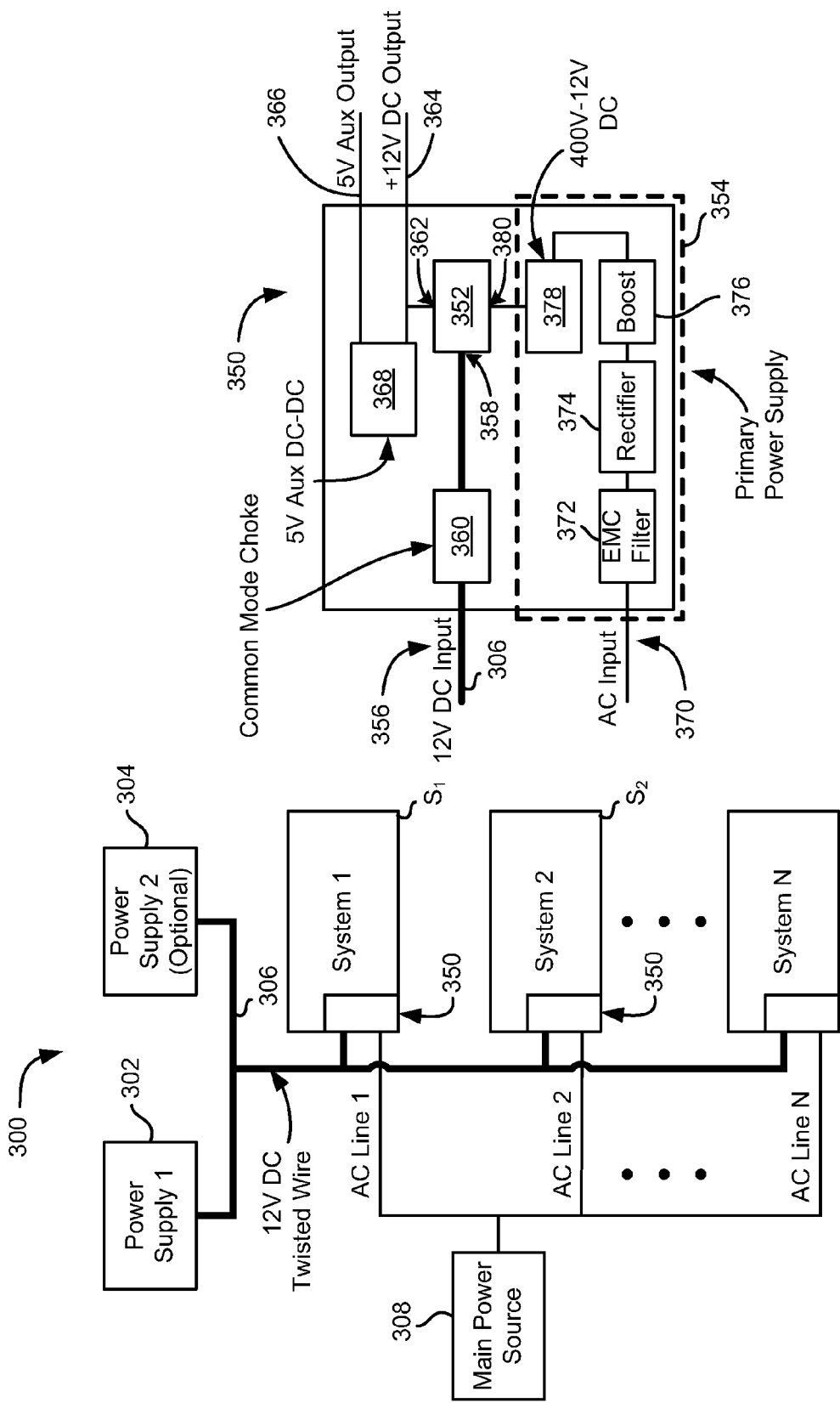

HIGHLY AVAILABLE NODE REDUNDANCY POWER ARCHITECTURE

BACKGROUND OF THE INVENTION

1. Field of the Invention

The present invention relates generally to power systems, and more particularly, to redundant node power systems.

2. Background Information

Referring to FIG. 1 and FIG. 2A, there is shown a prior art redundant node power system. Generally, these prior art systems use either an N+N scheme 100 (1+1, 2+2 . . . where power supplies are in parallel), as shown in FIG. 1, or an N+1 scheme 200, again with power supplies in parallel, as shown in FIG. 2A. A disadvantage of these conventional redundant power systems is that they can be expensive to implement. Also, conventional redundant power systems can require extra space in a rack R (shown in FIG. 2B) for accommodating excess power system hardware. The extra space in the rack R used by conventional redundant power systems can reduce space in the rack R for data processing and data storage systems, thus reducing the maximum data processing capability of the rack R.

Also, a known problem of conventional redundant power systems using existing N+1 DC distribution systems, is that it is difficult to achieve AC redundancy. This is because of the availability of only two independent AC power sources.

As shown in FIG. 2B, a schematic diagram of a prior art 12V DC distribution architecture, it can be seen how many 12V DC buses are used to distribute power from the Power Distribution Chassis (PDC) to each individual system (e.g., System 1, System 2, . . . , System N). Each individual system, $S_1, S_2, \ldots, S_N$, has a 12V DC bus connected to a 12V DC connector. As can be appreciated, the complexity of wiring and noise suppression can be problematic due to DC cable mesh and high circulation currents, for example.

Therefore, it would be beneficial to have a redundant power systems that could be achieved for lower cost and still provide a system which avoids the problems associated with conventional systems used for Node Redundancy.

SUMMARY OF THE INVENTION

According to one embodiment, an electronics device includes a first direct current (DC) input coupled to a first input of an OR logic gate. The first DC input is fed by at least one external power supply. A DC output is generated by an alternating current (AC) input and coupled to a second input of the OR logic gate, and at least one DC output is coupled to an output of the OR logic gate. The OR logic gate provides DC voltage to the at least one DC output to power a system.

In another embodiment, an electronics device includes a first direct current (DC) input fed by two external power supplies coupled to a first input of an OR logic gate, a DC output generated by an alternating current (AC) input and coupled to a second input of the OR logic gate which provides a DC voltage to at least one DC output to power a system. The OR logic gate provides DC voltage to the system from the first DC input only when voltage from the AC input is not available.

According to another embodiment, an apparatus for providing node redundant power to a system includes a plurality of devices and a backup power supply for supplying a voltage coupled to a common node. Each device includes a power supply, and a first direct current (DC) input coupled to a first input of an OR logic gate, and a second DC input of the OR logic gate is coupled to a second DC input representing an alternating current (AC) input, and at least one DC output is coupled to an output of the OR logic gate. The OR logic gate provides DC voltage to the at least one DC output to power the system from the first DC input when voltage from the AC input is not available.

In another embodiment, a rack system for housing a plurality of devices includes a first common node for supplying a first direct current (DC) voltage to a first DC input of a power supply of each of the plurality of devices. The power supply of each of the plurality of devices includes at least one DC output to power a system coupled to an output of an OR logic gate. Also, the first DC input is coupled to a first input of the OR logic gate. Each power supply also includes a power supply section coupled to an alternating current (AC) input and to a second input of the OR logic gate, the power supply section converting AC voltage to DC voltage provided to the OR logic gate. The OR logic gate provides a DC voltage to the at least one DC output from the power supply section to power the system except when the AC input is interrupted, in which case the at least one DC output is provided the DC voltage from the first DC input.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the invention, as well as a preferred mode of use, reference should be made to the following detailed description read in conjunction with the accompanying drawings, in which:

FIG. 3A is a simplified diagram of a node redundant power system according to one embodiment.

FIG. 3B is a simplified diagram of a power supply according to one embodiment.

DESCRIPTION OF THE PREFERRED EMBODIMENTS

Figure 1:
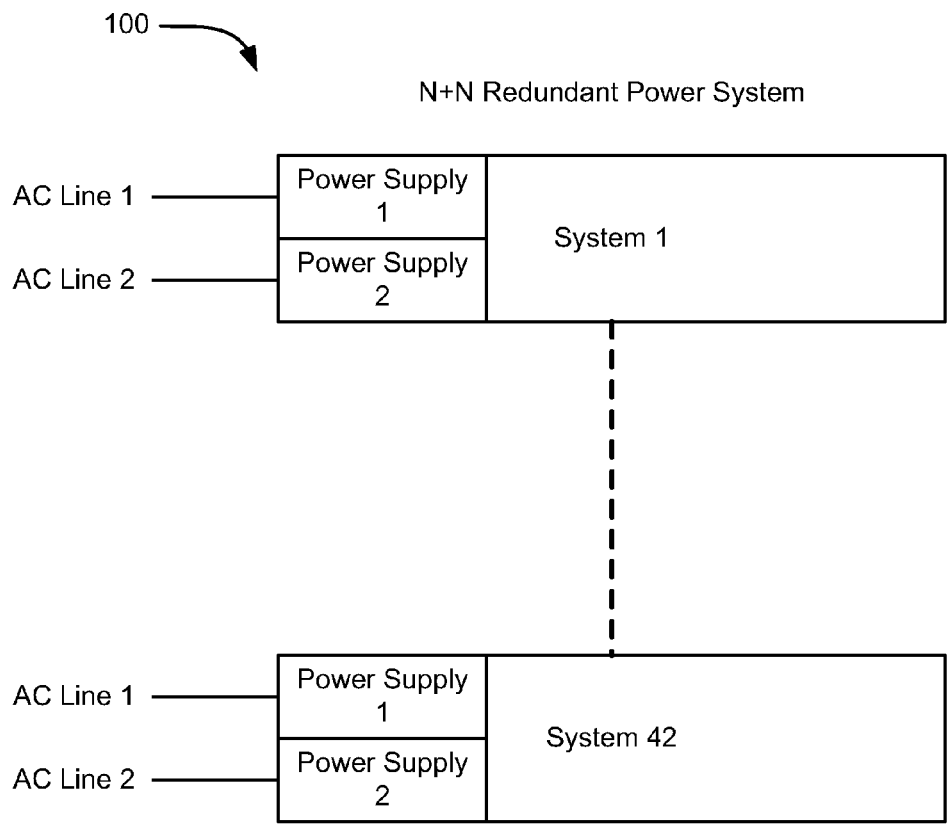
FIG. 1 is a simplified diagram of an N+N node redundant power system according to the prior art.

The following description is made for the purpose of illustrating the general principles of the invention and is not meant to limit the inventive concepts claimed herein. Further, particular features described herein can be used in combination with other described features in each of the various possible combinations and permutations. Unless otherwise specifically defined herein, all terms are to be given their broadest possible interpretation including meanings implied from the specification as well as meanings understood by those skilled in the art and/or as defined in dictionaries, treatises, etc.

The description may disclose several preferred embodiments of redundant power systems, as well as operation and/or component parts thereof. While the following description will be described in terms of a redundant power system providing 12V DC for clarity and to place the invention in context, it should be kept in mind that the teachings herein may have broad application to power systems supplying other voltages.

The embodiments described below disclose a new system for avoiding the generally expensive methods of achieving node redundancy, reducing rack space, and reducing noise generated in conventional systems by using one or two extra AC-DC power supplies, according to some embodiments.

In one general embodiment, an electronics device includes a first direct current (DC) input fed by at least one external power supply coupled to a first input of an OR logic gate and a second DC input generated by an alternating current (AC) input coupled to a second input of the OR logic gate which provides a DC voltage to at least one DC output to power a system.

In another general embodiment, an electronics device includes a first direct current (DC) input fed by two external power supplies coupled to a first input of an OR logic gate, a second DC input generated by an alternating current (AC) input coupled to a second input of the OR logic gate which provides a DC voltage to at least one DC output to power a system. The OR logic gate provides DC voltage to the system from the first DC input only when voltage from the AC input is not available.

In another general embodiment, an apparatus for providing node redundant power to a system includes a plurality of devices and a backup power supply for supplying a voltage coupled to a common node. Each device includes a power supply, and a first direct current (DC) input of each power supply is coupled to the common node. The first DC input of each power supply is coupled to a first input of an OR logic gate, and a second input of the OR logic gate is coupled to a second DC input representing an alternating current (AC) input, and at least one DC output is coupled to an output of the OR logic gate. The OR logic gate provides DC voltage to the at least one DC output to power the system from the first DC input when voltage from the AC input is not available.

In another general embodiment, a rack system for housing a plurality of devices includes a first common node for supplying a first direct current (DC) voltage to a first DC input of a power supply of each of the plurality of devices. Each power supply includes at least one DC output to power a system coupled to an output of an OR logic gate. Also, the first DC input is coupled to a first input of the OR logic gate. Each power supply also includes a power supply section coupled to an alternating current (AC) input and to a second input of the OR logic gate, the power supply section converting AC voltage to DC voltage provided to the OR logic gate. The OR logic gate provides a DC voltage to the at least one DC output from the power supply section to power the system except when the AC input is interrupted, in which case the at least one DC output is provided the DC voltage from the first DC input.

Figure 4:
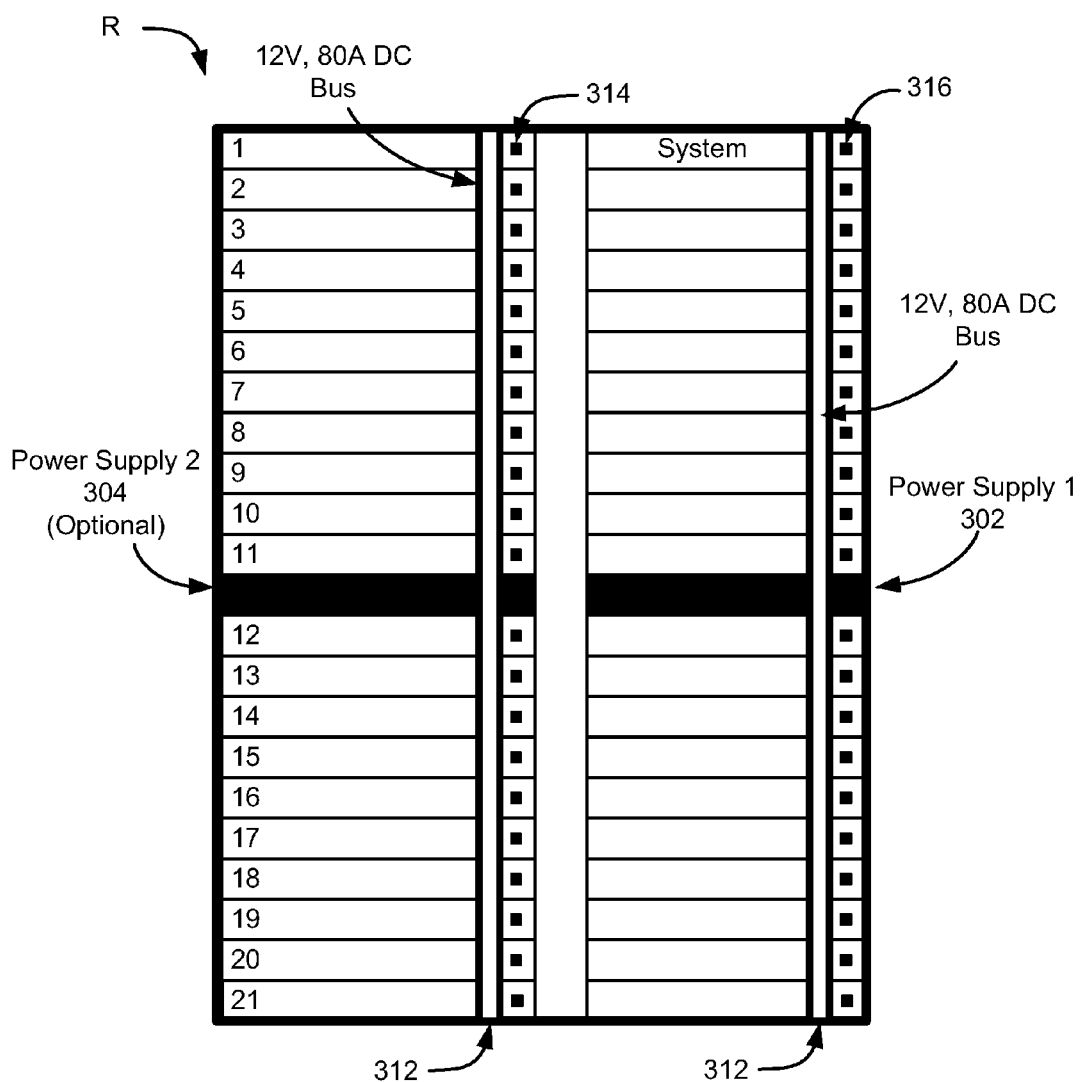
FIG. 4 is a simplified diagram of a rack arrangement for a node redundant power system according to one embodiment.

Now referring to FIG. 3A, FIG. 3B, and FIG. 4, there is shown, generally at 300, a power supply system according to one embodiment. As shown in FIG. 3A, a first external DC voltage power supply 302 is used to provide node redundancy. To provide a higher level of availability, a second external DC voltage power supply 304, may optionally be connected in parallel with the first power supply 302. The DC voltage power supplies 302, 304 can provide DC voltage to each individual system $S_1, S_2, \ldots, S_N$ in a rack R. In one embodiment, the output of the external power supplies 302, 304 may be set at a lower voltage point (such as 12V) compared to a higher voltage point (such as 12.2V) for a main power source (to be discussed thoroughly hereinafter). The DC power supplies 302, 304 may provide a +12V DC output 306 that is fed to a power subassembly 350 coupled to each individual system $S_1, S_2, \ldots, S_N$ of the rack R of the system 300, via a suitable medium. A suitable medium for feeding the +12V DC output 306 to the system $S_1, S_2, \ldots, S_N$ may comprise a twisted wire pair, a bus bar 312 (shown in FIG. 4), or any other suitable medium.

Referring to FIG. 3A and FIG. 3B, and particularly to FIG. 3B, a power subassembly 350 is coupled to each individual system $S_1, S_2, \ldots, S_N$ of the rack R according to one embodiment. Each power subassembly 350 includes an OR logic gate 352 and a primary power supply section 354. Each power subassembly 350 has a 12V DC input 356 coupled to the DC output 306 for receiving +12 DC from either or both of the external DC power supplies 302, 304. The DC input 356 is coupled to a first input 358 of the OR logic gate 352 through a common mode choke 360. The OR logic gate 352 has a output 362 that is coupled to its respective system $S_1, S_2, \ldots, S_N$ to provide 12V DC output 364 to the system $S_1, S_2, \ldots, S_N$.

A 5V Auxiliary output 366 may also be provided by using a DC-DC regulator 368. In one embodiment, if the 12V DC input 356 is providing power to the subassembly 350, the OR logic gate 352 is in an "ON" state (to be discussed below). The output 362 of the OR logic gate 352 is passed through the 5V Aux DC-DC regulator 368 and to the 5V Auxiliary output 366. The 12V DC input 356 provides sufficient power to the system $S_1, S_2, \ldots, S_N$ via the subassembly 350 and also maintains the 5V Auxiliary (Aux) power output 366 for monitoring purposes.

Still referring to FIG. 3A and FIG. 3B, in one embodiment, the primary power supply section 354 of each power subassembly 350 is coupled to a main power source 308. The main power source 308 may comprise an AC voltage power source that typically provides AC voltage to each individual system $S_1, S_2, \ldots, S_N$ of the rack R. The primary power supply section 354 of each power subassembly 350 has an AC input 370 coupled to the main power source 308. In one embodiment, the AC input 370 may pass through an EMC filter 372, then through a rectifier 374 for converting AC voltage from the AC input 370 to DC voltage, a booster 376, through a 400V to 12V DC output regulator 378, and then to a second input 380 of the OR gate 352. Thus, from either the DC input 356 or AC input 370, the OR logic gate 352 provides a +12V DC output 364 to its respective system $S_1, S_2, \ldots, S_N$.

The OR gate 352 may be a hardware gate consisting of either a metal-oxide-semiconductor field-effect transistor (MOSFET) or a diode. The functionality of the OR logic gate 352, according to one embodiment, may be to provide DC voltage from the output of the primary power supply section 354 of each power subassembly 350 to the +12V DC output 364 during normal operation. However, should the primary power supply section 354 fail to provide adequate voltage, for example the main power source 308 fails, the OR logic gate 352 then uses the 12V DC input 356 to provide power to its respective system $S_1, S_2, S_N$.

In some embodiments, when the primary power supply section 354 is supplying adequate voltage to the system, via the OR logic gate 352, the OR logic gate 352 may provide voltage back to the 12V DC input 356 along the twisted wire pair. In this manner, according to one embodiment, the output of primary power supply section 354 and OR logic gate 352 may be fed with the output of every power subassembly 350 in the rack R. In case the primary power supply section 354 of one of the power subassemblies 350 in the system 300 fails to provide power to its 12V DC output 364, at least one of the external DC voltage power supplies 302, 304 keep the system 300 running, thus providing node redundancy.

As noted above, during normal operation of the system 300, the external DC power supplies 302, 304 do not provide power to the system 300. Only when the primary power source 308 in the system is interrupted, or otherwise fails to provide sufficient power to the primary power supply section 354 of the power subassemblies 350, do the external power supplies 302, 304 start providing power to a particular system or systems $S_1, S_2, \ldots, S_N$ in the rack R. Advantages of this arrangement include reduced cost of installation and operation, fewer Electromagnetic Compliance (EMC) problems, and higher reliability due to the overall simplicity of the system 300.

Now referring to FIG. 4, the DC output (306, FIG. 3A) of either or both of the external power supplies 302, 304 is fed to each system $S_1, S_2, \ldots, S_N$ in the rack R via a suitable medium. In one embodiment, the DC output (306, FIG. 3A) is fed to each system $S_1, S_2, \ldots, S_N$ the over the twisted wire pair or a DC Bus bar 312 through DC feeds 314, 316, etc.

Figure 2A:
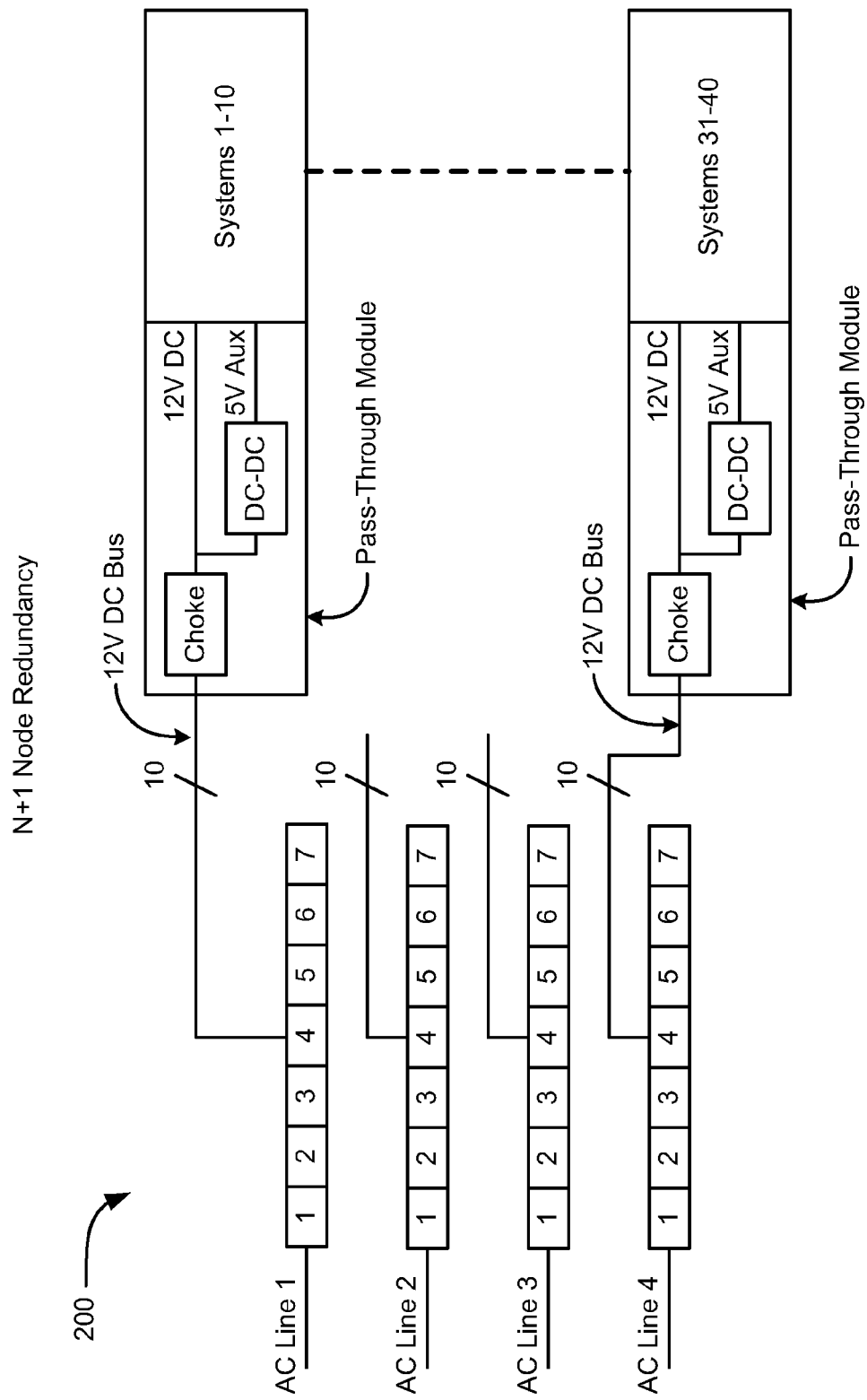
FIG. 2A is a simplified diagram of an N+1 node redundant power system according to the prior art.
Figure 2B:
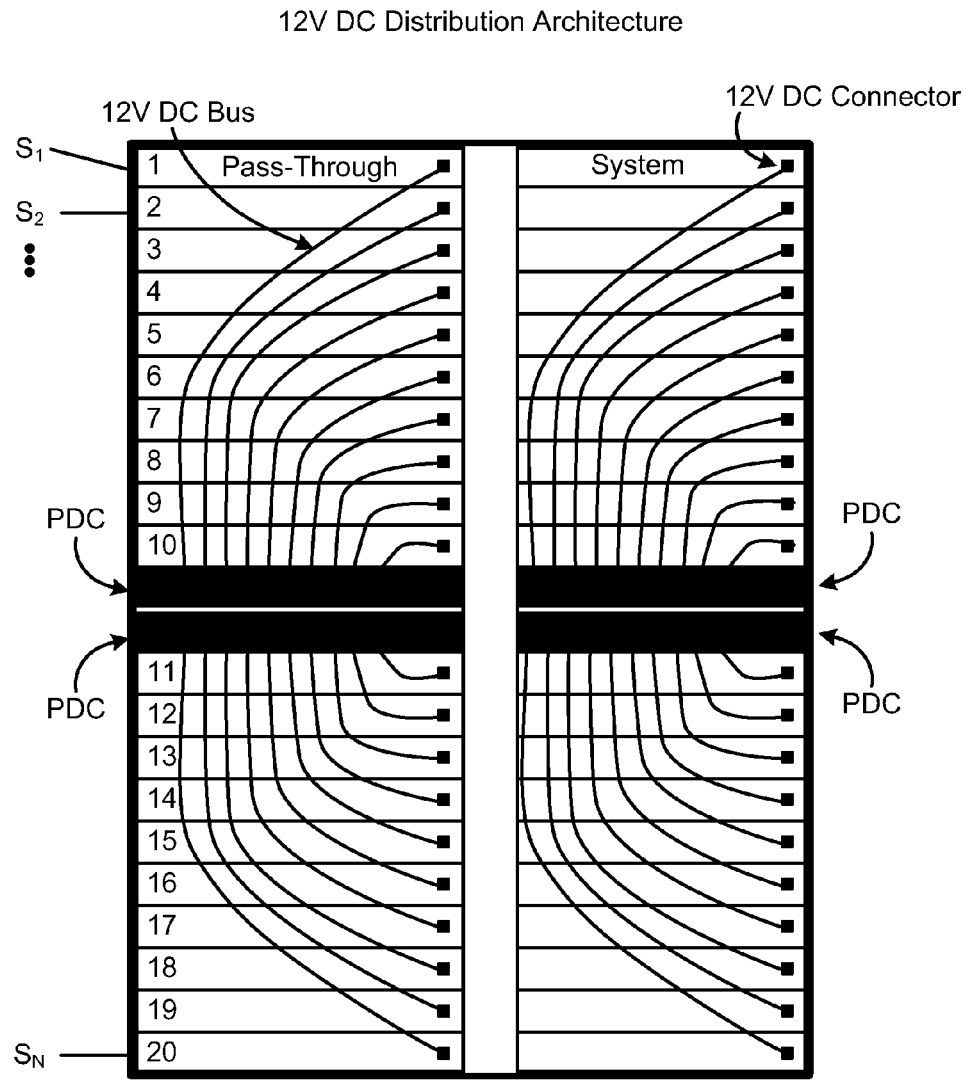
FIG. 2B is a simplified diagram of an N+1 12V DC distribution in a rack according to the prior art.

The output of the primary power supply 354 in each system and the common 12V DC input 356 are coupled together in the power subassembly 350 through the OR logic gate 352. If the main power source 308 is in normal operation, the OR logic gate 352 stays in an "OFF" state. If the main power source 308 is inadequate for any reason (e.g., is malfunctioning, disabled, off, down, etc.), the OR logic gate 352 switches to the "ON" state, and at least one of the external 12V DC power supplies 302, 304 provide power to the appropriate system $S_1, S_2, \ldots, S_N$ and also maintains the 5V Auxiliary (Aux) power for monitoring purposes. Thus, without using multiple DC feeds from a centralized DC source, the power system 300 provides power backup to any system drawing power only when a power supply in a particular system does not work. Also, the cable mesh shown in prior art FIG. 2B is avoided, thus avoiding the problems associated with such a configuration, such as radiation produced by the cable mesh.

Those skilled in the art will appreciate that various adaptations and modifications of the just-described preferred embodiments can be configured without departing from the scope and spirit of the invention. Therefore, it is to be understood that, within the scope of the appended claims, the invention may be practiced other than as specifically described herein.

What is claimed is:

1. An electronics device, the device comprising:
    a first direct current (DC) input coupled to a first input of an OR logic gate, the first DC input fed by at least one external power supply;
    a DC output generated by an alternating current (AC) input and coupled to a second input of the OR logic gate;
    an EMC filter and a rectifier for converting AC voltage to DC voltage and a booster coupled in series with the alternating current (AC) input; and
    at least one DC output coupled to an output of the OR logic gate,
    wherein the OR logic gate provides DC voltage to the at least one DC output to power a system.

2. The device according to claim 1, wherein the OR logic gate is a metal-oxide-semiconductor field-effect transistor (MOSFET).

3. The device according to claim 1, further comprising a common mode choke coupled to the second DC input and the OR logic gate and positioned between the second DC input and the OR logic gate.

4. The device according to claim 1, wherein the OR logic gate provides DC voltage from the first DC input to the DC output when voltage from the AC input is not available.

5. The device according to claim 1, wherein two or more external power supplies feed the first DC input.

6. An apparatus for providing node redundant power to a system, the apparatus comprising:
    a plurality of electronics devices, each device including a power supply, wherein each power supply comprises:
    a first direct current (DC) input coupled to a first input of an OR logic gate;
    a DC output generated by an alternating current (AC) input and coupled to a second input of the OR logic gate; and
    at least one DC output coupled to an output of the OR logic gate,
    wherein the OR logic gate provides DC voltage to the at least one DC output to power the system from the first DC input only when voltage from the AC input is not available; and
    a backup power supply for supplying a voltage coupled to a common node,
    wherein the first DC input of each power supply is coupled to the common node.

7. The system according to claim 6, wherein the OR logic gate in each of the plurality of electronics devices is chosen from a list consisting of a metal-oxide-semiconductor field-effect transistor (MOSFET) and a diode.

8. The system according to claim 6, wherein each of the plurality of electronics devices comprises a common mode choke coupled to the second DC input of the OR logic gate.

9. The system according to claim 6, wherein each of the plurality of electronics devices comprises an EMC filter, a rectifier for converting AC voltage from the AC input to DC voltage, and a booster coupled in series with the AC input.

10. A rack system for housing a plurality of electronics devices, the system comprising:
    a first common node for supplying a first direct current (DC) voltage to a DC input of a power supply of each of the plurality of devices,
    wherein the power supply of each of the plurality of devices comprises:
    at least one DC output to power a system coupled to an output of an OR logic gate, wherein the DC input of the power supply is coupled to a first input of the OR logic gate;
    a power supply section coupled to an alternating current (AC) input and to a second input of the OR logic gate, the power supply section converting AC voltage to DC voltage to provide DC voltage to the second input of the OR logic gate;
    wherein the OR logic gate provides a DC voltage to the at least one DC output from the power supply section to power a system except when the AC input is interrupted, and
    wherein the OR logic gate provides the DC voltage to the at least one DC output from the first DC input when the AC input is interrupted.

11. The rack system according to claim 10, wherein the OR logic gate in each of the plurality of electronics devices is chosen from a list consisting of a metal-oxide-semiconductor field-effect transistor (MOSFET) and a diode.

12. The rack system according to claim 10, wherein each of the plurality of electronics devices comprises a common mode choke coupled to the DC input of the power supply and to the first DC input of the OR logic gate.

13. The rack system according to claim 10, wherein the power supply section of each of the plurality of devices comprises an EMC filter, a rectifier for converting AC voltage from the AC input to DC voltage, and a booster coupled in series with the AC input.

* * * * *